June 28, 1938. W. M. SCOTT, JR 2,122,298
BUS BAR ASSEMBLY
Filed March 5, 1936
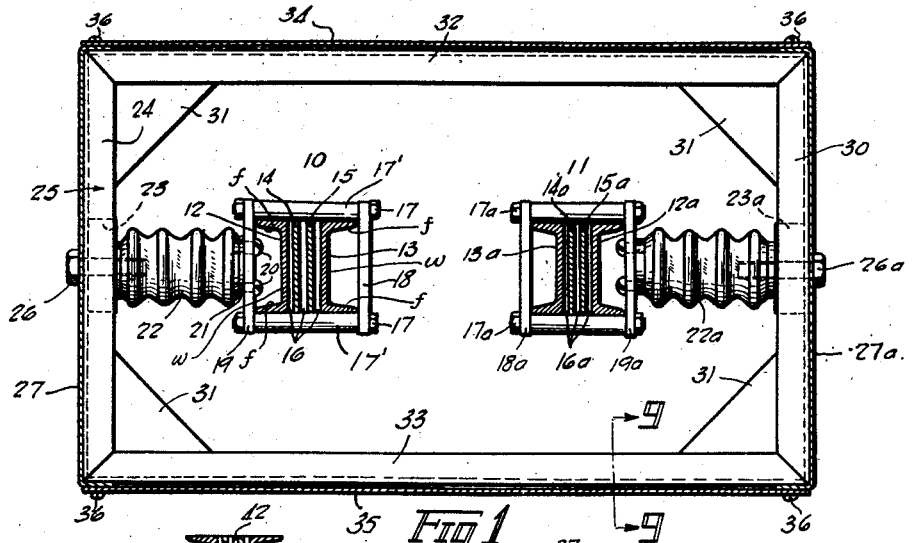

Patented June 28, 1938

2,122,298

UNITED STATES PATENT OFFICE 2,122,298

BUS BAR ASSEMBLY

William M. Scott, Jr., Philadelphia, Pa., assignor to I-T-E Circuit Breaker Company, Philadelphia, Pa., a corporation of New Jersey Application March 5, 1936, Serial No. 67,211

9 Claims. (Cl. 173—13)

My invention relates to electric bus bar structures or assemblies particularly of the type adapted to carry direct or alternating current of great magnitude, and has for an object the provision of a simple, reliable and inexpensive assembly which combines maximum current carrying capacity with compact, rigid self-contained structure well adapted to withstand forces incident to the reaction between the magnetic fields surrounding adjacent bus bar assemblies.

Further in accordance with my invention, each bus bar assembly or unit comprises a plurality of conductors, spaced one from the other for purposes of cooling, at least one conductor having one or more flanges, or equivalent, to impart rigidity to the entire group, said one conductor being sufficiently strong to withstand, without substantial flexure or strain, all laterally applied forces produced by current flowing through all of the associated conductors of the unit.

In accordance with another aspect of my invention one bus bar of a group of bars has an advantageous cross-sectional shape for carrying current and for resisting physical stress while an adjacent bar has an advantageous cross-sectional shape for carrying current and for compactness of the group of bars; further, these adjacent bars are spaced apart for ventilation and have opposed plane surfaces whereby a branch circuit conductor, at an angle to the above conductors, may be clamped between them and be supported therefrom.

In accordance with a further aspect of my invention, two bus bar assemblies forming the respective sides of a circuit are supported from insulators mounted directly opposite each other or in substantial alignment with each other, each oppositely disposed pair of insulators being secured to opposite sides of a ring of rigid members which are secured together and which circumscribe or enclose the respective pairs of insulators and their associated bus bar assemblies. In this manner, all electromagnetic forces tending to move or separate the bus bar assemblies are absorbed by the rigid members; no substantial forces are transmitted outwardly beyond the circumscribing rings of rigid members.

For a more complete understanding of my invention reference may now be had to the drawing in which Figure 1 is a sectional elevation of an elongated bus bar structure embodying my invention;

Fig. 2 is a sectional elevation of one of the bus bar assemblies showing taps extending at right angles to the bus bar assembly;

Fig. 3 is a fractional plan view of Fig. 2;

Fig. 4 is a fractional side elevation of Fig. 3;

Fig. 5 is a sectional elevation of the bus bar assembly taken on a line adjacent one form of a clamping means;

Fig. 6 is a fractional side elevation of the structure of Fig. 5 and includes a plan view of another of the clamping means shown in Fig. 1;

Fig. 7 is a sectional elevation of taps extending at right angles to a bus bar assembly of the type shown in Fig. 5;

Fig. 8 is a fractional side elevation of two adjacent bus bar assemblies connected together by flexible conductors;

Fig. 9 is a sectional elevation taken on the line 9—9 of Fig. 1.

Referring to the drawing, I have shown my invention in one form as applied to bus bar structure comprising two conductor units or groups 10 and 11 of elongated conductors which may form the positive and negative sides of a direct-current circuit. The outer conductors 12 and 13 of group 10 have channel sections; i. e., each conductor is provided with flanges $f$ extending substantially normal to the plane of their respective webs $w$. Between the conductors 12 and 13 are disposed relatively thin conductors 14 and 15 each having a rectangular cross-section, and separated from each other and from the outer conductors by means of relatively short spacer elements 16 of substantially the same thickness as conductors 14 and 15 and preferably of the same material as conductors 12-15, such as copper, aluminum, or the like. These conductors 12-15, at one or more points along their lengths, are rigidly clamped together, and are supported intermediate their ends from one or more insulators 22 spaced along their lengths, by means of bolts 17 which extend through plates 18 and 19, each plate 19 being secured, as by screws 20, to a corresponding metallic cap or end-piece 21 of each insulator 22. Preferably each of bolts 17 is provided with spacing sleeves 17' extending between the inner faces of plates 18 and 19 and whose lengths are sufficient to space the plates from the group of conductors a very small amount to provide for longitudinal movement thereof.

Each insulator 22 at its opposite end bears against a spacer block 23 mounted against the web and between the flanges 24 of a rigid channel-shaped member 25. A cap screw 26 passing through an outer cover plate 27 and the spacer block 23 threadedly engages the insulator 22 or a threaded insert to secure the insulator in fixed position.

The conductor unit 11, identical with that of unit 10, comprises outer-channel-shaped conductors 12a and 13a, spacer elements 16a, and relatively thin rectangular conductors or flat bars of oblong section 14a and 15a spaced from the outer conductors and from each other in the manner described above. The conductor unit 11, by plates 18a, 19a and bolts 17a, is supported from one or more insulators 22a which is or are supported from a rigid channel-shaped member 30 by means of cap screw 26a and spacer block 23a diametrically opposite the insulator 22. It will be observed the axes of the insulators lie in substantially the same plane and that the conductors of each unit are symmetrical about this plane, each insulator also being symmetrical about its central axis.

The respective channel bars or members 25 and 30 form in conjunction with a pair of side bars or members 32 and 33 having channel sections, an enclosing frame or ring. Preferably the ends of each of members 25, 30, 32 and 33 are beveled and welded together integrally to unite abutting webs and flanges of each of the members. The corners of the frame may be further strengthened by the use of gusset plates 31, welded, or otherwise secured to the channels. A plurality of these enclosing rings are spaced along the lengths of the conductor-units or assemblies 10 and 11 and absorb in tension all forces tending to separate the conductor-units. The spacing between the members 32 and 33 with respect to the groups of conductors 10 and 11 need not exceed the spacing between the inner conductors 12, 12a and their associated end members 25 and 30. As shown, the side walls 27 and 27a of an enclosing housing have their edges bent over the respective channel-shaped members 25 and 30. The upper and lower sides 34 and 35 of the housing are secured to the in-turned ends of side walls 27 and 27a as by bolts or screws 36.

As I have stated, a plurality of insulators are disposed along the lengths of the respective conductor-units 10 and 11, the number of such units and their associated clamping means being determined by mechanical considerations of strength and also with reference to the maximum electromagnetic forces that may result from current flowing through the respective conductor-units. In one embodiment of my invention the respective conductor-units formed a circuit between a plurality of parallel-connected direct-current generators supplying current for a plurality of motors. With all of the generators operating and connected by the respective conductor-units 10 and 11 to all of the motors the possible short-circuit value of the current was upwards of 200,000 amperes. Upon flow of current of such large magnitude the reaction between the magnetic fields surrounding each group of conductors, or conductor unit, develops substantial forces tending to separate the conductors or to move them away from each other, while the force on the conductors of each group tend to move them together. These forces may be as great as 300 or or 400 pounds or more per linear foot of the conductor. Accordingly, the insulators of each conductor-unit were spaced apart some twenty-four inches. With a current flow of short-circuit magnitude, no permanent or temporary distortion of the individual conductors, or of each conductor-unit or group will occur. Since the forces tending to separate the conductors are resisted by compressive stress on the insulators, there is little tendency to crack them, the insulators being particularly well adapted to withstand compressive stress and strain. In this connection the opposing insulators 22 and 22a need not be co-axial, nor the conductors exactly symmetrical about a plane through their axes. On the other hand, the displacement of either the insulators or the conductor-units from the aforesaid preferred arrangement should not in any event be so great as to cause substantial torsional forces, or lateral bending of the insulators to the point of rupture. The tendency of the insulators to move because of the forces applied thereto is resisted by the rigid channel-shaped members 25, 30, 32, 33, preferably formed of steel. Besides resisting the applied forces, the circumscribing rectangular ring 25, 30, 32, 33 prevents the transfer or application of the aforesaid forces to outside supporting structure. This is important inasmuch as the bus bar structure may be suspended from a wall, or roof of a building or may be mounted between switchboards, or the like. The structure may be supported by the sides 27 and 27a of the housing, the respective ends thereof being bolted to uprights or standards of switches, of panel boards or of associated apparatus. For relatively short conductor-units the bus bar connections to the ends of each of units 10 and 11 may be sufficient to carry the weight of structure.

If the magnetic forces were transmitted to the supporting structure, its cost would be greatly increased. Moreover, in the majority of applications the amount of space available for the bus bar structure is quite limited and it is therefore difficult to provide the additional supporting structure. However, in accordance with the present invention, the external supporting structure need only meet the requirements of carrying a part, or all of the weight of the structure, and need not be strong enough to withstand or absorb the magnetic forces developed by flow of short-circuit current or currents of like magnitude.

Since the conductors of each unit are substantially symmetrical with respect to their respective insulators, units 10 and 11 are uniformly loaded throughout their lengths and there is no substantial tendency for them to twist or otherwise rotate about their longitudinal axes and cause rupture of the insulators.

Because of the relatively high continuous current ratings of the conductor-units, for example, upwardly of 10,000 amperes alternating or direct, considerable losses occur in the conductors themselves and cause their temperatures to rise. In order to maintain the temperatures relatively low, the conductors, as indicated above, are preferably spaced from one another to provide vertical air passages between them. It has been found that with relatively wide conductors, approximately one-fourth of an inch in thickness, and spaced one from the other for ventilating purposes, minimum temperatures, for a given current flow, are attained by the conductor. Moreover, the use of these thin conductors in combination with one of more rigid design provides greater current-carrying capacity for a given dimension, normal to the plane of the web, than could be obtained by using a plurality of flanged bars. Furthermore, the flat bars are relatively inexpensive.

Conductors, however, of such a thickness are relatively flexible and would, if not restrained, bend or otherwise deform upon the development of the aforesaid magnetic forces. In accordance with my invention, however, I combine the advantages of the relatively thin conductors and impart rigidity to each conductor-unit by providing one or both of the outside conductors of each unit with flange structure to prevent lateral bending, the specific structure shown being channel-shaped bars having flanges extending away from the plane surface of their interconnecting web. These flanges withstand the lateral or bending and torsional forces, the cross-section or configuration of the flanges being selected to absorb or withstand without bending all of the forces developed by or applied to the several conductors of each unit disposed in spaced face-to-face relation with the plane surfaces of one or both the channel-shaped conductors.

When branch circuits or taps are connected to these bus bars a construction may be used as shown in Figs. 2, 3 and 4. The branch bars or connectors 41 are inserted between the main bars and bolts 37 are used to clamp the structure together. The branch bars may be of any convenient number and if the number is less than the spaces between the main bars, spacers or filler pieces, as 16 in Fig. 1, may be inserted.

In making connections for a branch circuit, parallel taps may be required, as one from each main bus bar group. These bars may be subject to short-circuit currents and consequent physical forces tend to produce relative movement. These forces may be transmitted to the main bus bar as a torque. The design of the main bus bar unit, however, enables it to withstand these strains.

It is, of course, understood that the bus bar group of the branch circuit may be composed of flat and flanged bars in the same manner as the main bus bar unit or group.

The weaker bars 14 and 15 between the insulators must be supported by the stronger bars 12 and 13. This is due to the fact that the electromagnetic forces act on the conductors individually so that the flat bars might be forced out of alignment with the flanged bars. For this reason it is desirable to provide clamping means in addition to the supports. Spacing plates as shown at 16 in Fig. 1 are introduced between the bars and bolted in place to provide for mutual support between the bars.

Another form of such a clamping means is shown in Fig. 5 and comprises upper and lower clamping members 38 and 39 of conductive material. These members 38 and 39 as copper or aluminum, are respectively provided with projections 38a and 39a which alternate with the conductors 12-15 to form the spacer elements between the conductors as well as to provide outer ends which overlap the edges of the respective flanges f. A single bolt 40, extending through the centers of the respective clamping members, and intermediate conductors 14 and 15, rigidly locks the conductors to the respective members 38 and 39. The diameter of the bolt 40 is preferably twice the thickness of one of the inner conductors 14 or 15. With this type of construction, when it is desired to provide taps or leads from a bus bar assembly, three conductors 41, Fig. 7, may be interposed between the respective conductors 12-15, a spacer element 42 being included in the assembly to maintain the air-gap between adjacent conductors. As shown in Fig. 6, the clamping members 38 and 39 are urged against the edges of the conductors, while the plates 18 and 19 prevent separation of the conductors.

One of these methods of maintaining the relative spacing between adjacent bars is necessary. If the bars were not so spaced at frequent intervals, as between the insulating supports, the heavy currents would draw the bars together and so distort the weaker bars.

Because of the heating effects upon the respective conductors of each group a certain amount of endwise expansion and contraction occurs, and, where the bus bar assemblies are of relatively great length, it is frequently desirable to interpose flexible connections. These connections may comprise flexible conductors 43 clamped between the respective conductors of bus bar assemblies 44 and 45. As shown, five flexible conductors are utilized, three of them being disposed between the conductors of each assembly and the outside conductors 43 being clamped respectively to the outer surfaces of the respective channel-shaped conductors.

While I have shown particular embodiments of my invention, it will be understood, of course, that I do not wish to be limited thereto since many modifications may be made and I, therefore, contemplate by the appended claims to cover any such modifications as fall within the true spirit and scope of my invention.

What I claim is:

1. A bus bar structure comprising a group of conductors electrically connected in parallel for flow of current which per unit of conductor length produces a uniform force acting on said conductors in a direction normal to their lengths, insulating supporting means spaced along said group of conductors, at least one conductor of said group having a rectangular cross section with a width large as compared to its thickness and of insufficient strength to resist lateral bending by said force, another conductor of said group having a web flat on one side and flange structure extending from the other side to impart to the structure sufficient strength for a length equal to the spacing of said supporting means to withstand said force, and means intermediate adjacent supporting means for clamping each said conductor of rectangular cross section in face-to-face relation with said flat side of said web.

2. In an electrical system comprising conductors carrying current, a group of conductors electrically in parallel and subjected to physical forces which are a function of the current carried by said conductors of said group, said group comprising at least one flat strip conductor and at least one channel-shaped conductor spaced laterally thereof with the plane of its web parallel to and directly facing the plane of said flat strip, and another conductor, whose axis is normal to the axis of said group, having opposed flat surfaces between and contacting the surfaces of said flat strip and channel-shaped conductors, said last-named conductor transmitting to said group physical forces which are a function of the magnitude of its current, said channel-shaped conductor having sufficient physical strength to withstand all forces, transverse and torsional, to which it is subjected.

3. A conductor unit for carrying current comprising one or more elongated conductors each having a web flat on one side and flange structure resistant to lateral flexure extending from its other side, one or more flat strip conductors, whose thicknesses are small as compared with the width of their flat faces, disposed in planes parallel to and spaced laterally from said flat side of said web, means for rigidly supporting the unit at spaced intervals, and means for preventing lateral flexure of said flat conductors by forces incident to current flow therethrough comprising structures disposed at spaced regions along said conductors, and between neighboring supporting means, for clamping said flat conductors in face-to-face relation with each other and with the flat side of said web, said web and said flange structure resisting the sum of all the forces of flexure incident to flow of current through said conductors.

4. A conductor unit for carrying current comprising one or more elongated conductors each having a web flat on one side and flange structure extending from its other side, one or more flat strip conductors, whose thicknesses are small as compared to the width of their flat faces, disposed in planes parallel to and spaced laterally from each other and from said flat side of said web, and means for preventing lateral flexure of said flat conductors by forces incident to current flow therethrough comprising electrically insulated means extending horizontally from said conductors and supporting them with the spaces between adjacent faces forming vertical ventilating passages, and structures spaced from each other along said conductors for clamping said flat conductors in fixed face-to-face relation with each other and with the flat side of said web, said flange structure having sufficient strength for a length equal to the spacing of said insulated means to withstand the resultant of said forces for current flow of short-circuit magnitude.

5. In combination, a first elongated conductor having a cross-section in the form of a relatively thin rectangle, a second elongated conductor having a flat surface on one side and flange structure extending from the other side substantially to prevent lateral and torsional deflection thereof, means for securing said conductors together in face-to-face relation with adjacent flat surfaces of said conductors spaced laterally one from the other to form a rigid elongated current-carrying conductor unit, said last-named means including clamping means spaced along said conductors and rigidly supporting said first conductor from said second conductor, and insulated supporting means spaced along said unit, said flange structure having sufficient strength for a length equal to the spacing of said supporting means to withstand the resultant of all forces incident to current flow through, and to prevent bending of, said conductors.

6. A conductor unit comprising a plurality of elongated conductors electrically in parallel, one of said conductors, in the form of a rectangular strip, having a rectangular cross section with a width large as compared with its thickness, a second conductor of channel-shape having channel-flanges connected by a web which is equal in width to that of said one conductor, and clamping means retaining said conductors in closely spaced face-to-face relationship with said channel-flanges extending away from said rectangular conductor.

7. A conductor unit for carrying current comprising an elongated conductor having a web flat on one side and flange structure resistant to lateral flexure extending from its other side, a second elongated conductor, of rectangular cross section and whose thickness is small as compared to the width of its flat sides, electrically in parallel with said first conductor, and means retaining said conductors in positions with their longitudinal axes parallel to each other, and with said flat sides in face-to-face relation.

8. A conductor unit for carrying current comprising two channel-shaped conductors, each having a web flat on one side and flange structure extending from its other side, disposed with the flat sides of the webs in face-to-face relation, one or more flat strip conductors, whose thicknesses are small as compared with the widths of their flat faces, disposed in planes parallel to and spaced between and laterally from said flat sides of said webs, means spaced longitudinally of the unit for supporting it, and means for preventing lateral flexure of said flat conductors comprising structure intermediate neighboring supporting means for rigidly securing said flat conductors to said channel-shaped conductors, said flange structures preventing lateral flexure of all of said conductors.

9. A bus bar structure including at least two groups of elongated conductors for carrying current of large magnitude, the current through said groups causing a substantial force to be developed tending to move said conductors of each group in directions normal to their lengths, and each of said groups comprising an elongated conductor having a web flat on one side and flange structure resistant to lateral flexure extending from its other side, a second elongated conductor of rectangular cross section and whose thickness is small as compared to the width of its flat sides, electrically in parallel with said first conductor, and means retaining said conductors in positions with their longitudinal axes parallel to each other, and with said flat sides in face-to-face relation.

WILLIAM M. SCOTT, Jr.

CERTIFICATE OF CORRECTION.

Patent No. 2,122,298. June 28, 1938.

WILLIAM M. SCOTT, JR.

It is hereby certified that error appears in the printed specification of the above numbered patent requiring correction as follows: Page 3, first column, line 52, after the syllable "terial" and before the period insert the comma and words , as copper or aluminum; and lines 52 and 53, strike out the words and comma "as copper or aluminum,"; and that the said Letters Patent should be read with this correction therein that the same may conform to the record of the case in the Patent Office.

Signed and sealed this 2nd day of August, A.D. 1938.

(Seal)

Leslie Frazer,
Acting Commissioner of Patents.